(12) United States Patent
Yeakley et al.

(10) Patent No.: US 9,916,860 B2
(45) Date of Patent: Mar. 13, 2018

(54) AZIMUTH ACTUATED DUAL DEVICE SET POSITIONING

(71) Applicants: Darryl Wayne Yeakley, Erie, CO (US); William J. Vanderheyden, Loveland, CO (US); Steven Gregory Trabert, Boulder, CO (US); Oracle International Corporation, Redwood City, CA (US)

(72) Inventors: Darryl Wayne Yeakley, Erie, CO (US); William J. Vanderheyden, Loveland, CO (US); Steven Gregory Trabert, Boulder, CO (US)

(73) Assignee: ORACLE INTERNATIONAL CORPORATION, Redwoood Shores, CA (US)

( * ) Notice: Subject to any disclaimer, the term of this patent is extended or adjusted under 35 U.S.C. 154(b) by 55 days.

(21) Appl. No.: 13/800,026

(22) Filed: Mar. 13, 2013

(65) Prior Publication Data

US 2014/0268408 A1 Sep. 18, 2014

(51) Int. Cl.
*G11B 20/20* (2006.01)
*G11B 5/584* (2006.01)
(Continued)

(52) U.S. Cl.
CPC .......... *G11B 21/103* (2013.01); *G11B 5/4893* (2013.01); *G11B 5/56* (2013.01); *G11B 5/584* (2013.01)

(58) Field of Classification Search
CPC ......... G11B 5/4893; G11B 5/584; G11B 5/56; G11B 21/103
See application file for complete search history.

(56) References Cited

U.S. PATENT DOCUMENTS 4,424,541 A * 1/1984 Koinuma ............. G11B 5/0083
 360/121
5,680,278 A * 10/1997 Sawtelle, Jr. ................. 360/261
(Continued)

FOREIGN PATENT DOCUMENTS

CN 1357879 A 7/2002
CN 102763161 A 10/2012
(Continued)

OTHER PUBLICATIONS

International Search Report dated Jul. 21, 2014 from PCT/US2014/021071, filed Mar. 6, 2014, 3 pgs.

*Primary Examiner* — Andrew L Sniezek
(74) *Attorney, Agent, or Firm* — Invoke

(57) ABSTRACT

A device for recording and/or reading data to and/or from a magnetic tape includes a read/write head which has a first device set including a first plurality of magnetic data write and/or read elements and a second device set including a second plurality of magnetic data write and/or read elements. The device also includes a lateral positioning actuator and an azimuth actuator. The lateral positioning actuator and azimuth actuator are used together to position both device sets on the magnetic tape. The lateral positioning actuator laterally positions the read/write head such that during write and/or read operations the first and second pluralities of magnetic data write and/or read elements align laterally to first and second pluralities of recordable and/or readable data tracks on the magnetic tape. The azimuth actuator rotates the read/write head about an azimuthal angle. such that the elements align to lateral spacings.

13 Claims, 4 Drawing Sheets

(51) Int. Cl.
 *G11B 21/10* (2006.01)
 *G11B 5/48* (2006.01)
 *G11B 5/56* (2006.01)

(56) References Cited

U.S. PATENT DOCUMENTS

| | | |
|---|---|---|
| 6,222,698 B1 | 4/2001 | Barndt et al. |
| 6,331,920 B1 * | 12/2001 | Albrecht ............ G11B 5/00878 360/251.1 |
| 7,342,738 B1 * | 3/2008 | Anderson et al. ......... 360/77.12 |
| 8,054,576 B2 * | 11/2011 | Bui et al. .................... 360/77.12 |
| 2002/0163752 A1 | 11/2002 | Peterson |

FOREIGN PATENT DOCUMENTS

| | | |
|---|---|---|
| EP | 0 959 454 A2 | 11/1999 |
| EP | 1 204 096 A2 | 10/2001 |
| JP | H11-353630 A | 12/1999 |
| JP | 2005-259198 A | 9/2005 |

\* cited by examiner

AZIMUTH ACTUATED DUAL DEVICE SET POSITIONING

TECHNICAL FIELD

In at least one aspect, the present invention relates to read/write heads for magnetic tape drives, and in particular, to positioning of such read/write heads.

BACKGROUND

In recording head technology, much thought is put into the positioning of the write/read devices on the head. The positioning of these devices is important in order to meet recording throughput and capacity requirements in the most efficient and inexpensive way possible while making the system robust to variations that exist in areas such as head manufacturing, tape to head azimuth (angle), and media width.

As recording densities increase, these variations become an even larger problem and make it increasingly difficult to properly position the writers and readers on the media which can lead to write and/or read position errors. One way to minimize position errors caused by these variations is to reduce the write and/or read device set span on the media. This is typically done by reducing the spacing between the individual write and/or read magnetic elements within the device set and thereby reducing the overall device set span. This method, however, complicates the head manufacturing process. In addition, moving the magnetic elements closer together within the device set increases the likelihood of crosstalk between the elements which can negatively impact drive write and/or read performance.

An alternate method of reducing device set span without these negative side effects is described here. This new method is accomplished by splitting the write and/or read device set into two sets, with each having half the number of magnetic elements and half the span of the original device set. The spacing between the individual elements within the two new device sets remains the same as the spacing between the elements in the original device set. Each of these smaller device sets would then be independently positioned on the media for writing and/or reading. FIG. 1 provides an illustration of the effects of media width variations on the spacing of the data tracks on the media. Magnetic tape 10 includes a plurality of data tracks 12 which are separated by a distance d. Expansion of magnetic tape 10 as depicted by arrow "A" leads to widening of the tape which is accompanied by widening of the spacing de between the data tracks. Contraction of magnetic tape 10 as depicted by arrow "B" leads to a narrowing of the tape which is accompanied by a decrease in the spacing dc between data tracks. Tape tension, temperature, and humidity are major contributors to tape expansion and contraction effects.

As the densities at which data is recorded onto or read from the media increase, new methods of compensating for variations in the tape drive system such as variations in head manufacturing, tape to head azimuth (angle), and media width are required. There is a need for improved magnetic read/write heads and for improved methods of positioning the head magnetic elements on the storage media. In particular, a new method is needed for independently actuating and positioning dual write and/or read device sets located on a single recording head to reduce the span of those device sets on the media.

SUMMARY OF THE INVENTION

The present invention solves one or more problems of the prior art by providing in at least one aspect a device for recording and/or reading data to and/or from a magnetic tape. The device includes a magnetic head having a first device set and a second device set. The first device set includes a first plurality of magnetic elements and the second device set includes a second plurality of magnetic elements. The device also includes a lateral positioning actuator and an azimuth actuator. The lateral positioning actuator and azimuth actuator are used together to position both device sets on the media. The lateral positioning actuator positions both device sets laterally on the media while the azimuth actuator is used to correct the lateral spacing error between the device sets and the media. In a simplified example of this dual actuator system, the lateral positioning actuator continuously positions the magnetic head such that the first plurality of magnetic elements remains aligned to a first plurality of data tracks on the magnetic tape. This continuous alignment of the lateral positioning actuator is necessary to overcome any lateral misalignment subsequent actuation of the azimuth actuator may cause. While the first plurality of magnetic elements remains aligned to a first plurality of data tracks by the lateral positioning actuator, the azimuth actuator rotates the magnetic head about an azimuthal angle such that the second plurality of magnetic elements are aligned to a second plurality of data tracks on the magnetic tape. The azimuthal angle is an angle of rotation about an axis perpendicular to the magnetic tape.

In another aspect, a device for recording data to a magnetic tape is provided. The device includes a read/write head which has a first device set and a second device set. The first device set includes a first plurality of magnetic data write elements and the second device set includes a second plurality of magnetic data write elements. The device also includes a lateral positioning actuator and an azimuth actuator. The lateral positioning actuator laterally positions the read/write head such that during write operations the first plurality of magnetic data write elements continuously aligns to a first plurality of recordable data tracks on the magnetic tape. While the first plurality of magnetic data write elements remains aligned to a first plurality of data tracks by the lateral positioning actuator, the azimuth actuator rotates the read/write head about an azimuthal angle such that during write operations the second plurality of magnetic data write elements aligns to a second plurality of recordable data tracks on the magnetic tape. The azimuthal angle again being an angle of rotation about an axis perpendicular to the magnetic tape.

In another aspect, a device for reading data from a magnetic tape is provided. The device includes a read/write head which has a first device set and a second device set. The first device set includes a first plurality of magnetic data read elements and the second device set includes a second plurality of magnetic data read elements. The device also includes a lateral positioning actuator and an azimuth actuator. The lateral positioning actuator laterally positions the read/write head such that during read operations the first plurality of magnetic data read elements continuously aligns to a first plurality of readable data tracks on the magnetic tape. While the first plurality of magnetic data read elements remains aligned to a first plurality of data tracks by the lateral positioning actuator, the azimuth actuator rotates the read/write head about an azimuthal angle such that during read operations the second plurality of magnetic data read elements aligns to a second plurality of readable data tracks on the magnetic tape. The azimuthal angle again being an angle of rotation about an axis perpendicular to the magnetic tape.

In another aspect, a device for recording and/or reading data to and/or from a magnetic tape is provided. The device includes a read/write head which has a first device set and a second device set. The first device set includes a first plurality of magnetic data write elements and a first plurality of magnetic data read elements. The second device set includes a second plurality of magnetic data write elements and a second plurality of magnetic data read elements. The device also includes a lateral positioning actuator and an azimuth actuator. The lateral positioning actuator laterally positions the read/write head such that during write operations the first plurality of magnetic data write elements continuously aligns to a first plurality of recordable data tracks on the magnetic tape and that during read operations the first plurality of magnetic data read elements continuously aligns to a first plurality of readable data tracks on the magnetic tape. While the first plurality of magnetic data write and/or read elements remains aligned to a first plurality of data tracks during write and/or read operations, the azimuth actuator rotates the read/write head about an azimuthal angle such that the second plurality of magnetic data write and/or read elements aligns to a second plurality of recordable and/or readable data tracks on the magnetic tape. The azimuthal angle is again an angle of rotation about an axis perpendicular to the magnetic tape.

Advantageously, rotation with an azimuth angle compensates for lateral dimensional errors that exist between the dual write and/or read device sets and the tape media.

A new method for independently actuating and positioning dual write and/or read device sets located on a single recording head is defined here. This new method can be used to compensate for variations in the tape drive system such as variations in head manufacturing, tape to head azimuth (angle), and media width.

Other exemplary aspects of the invention will become apparent from the detailed description provided hereinafter. It should be understood that the detailed description and specific examples, while disclosing exemplary aspects, are intended for purposes of illustration only and are not intended to limit the scope of the invention.

BRIEF DESCRIPTION OF THE DRAWINGS

Exemplary aspects of the present invention will become more fully understood from the detailed description and the accompanying drawings, wherein.

DETAILED DESCRIPTION

Reference will now be made in detail to presently preferred compositions, aspects and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
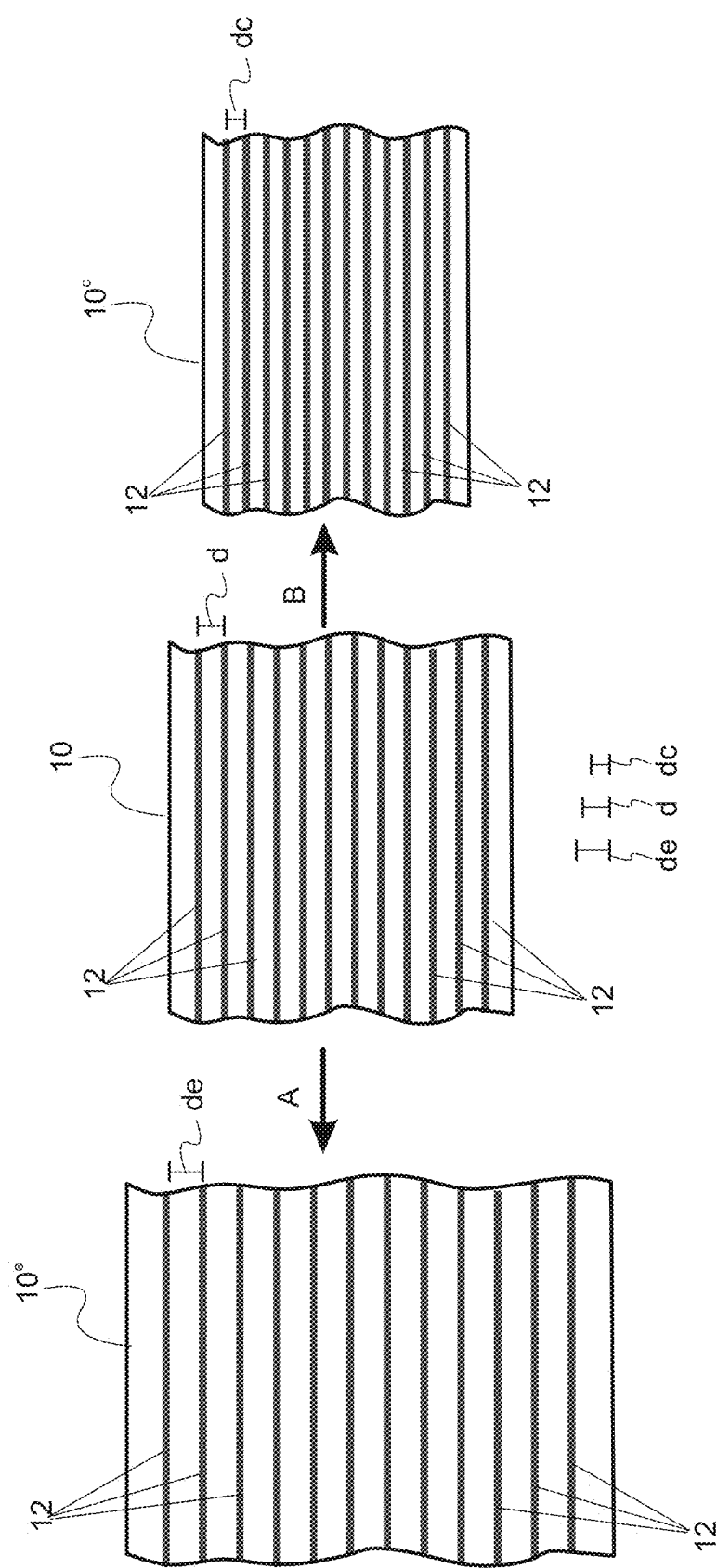
FIG. 1 is a schematic illustrating the effects of media width variations on the spacing of the data tracks on the media.
Figure 2:
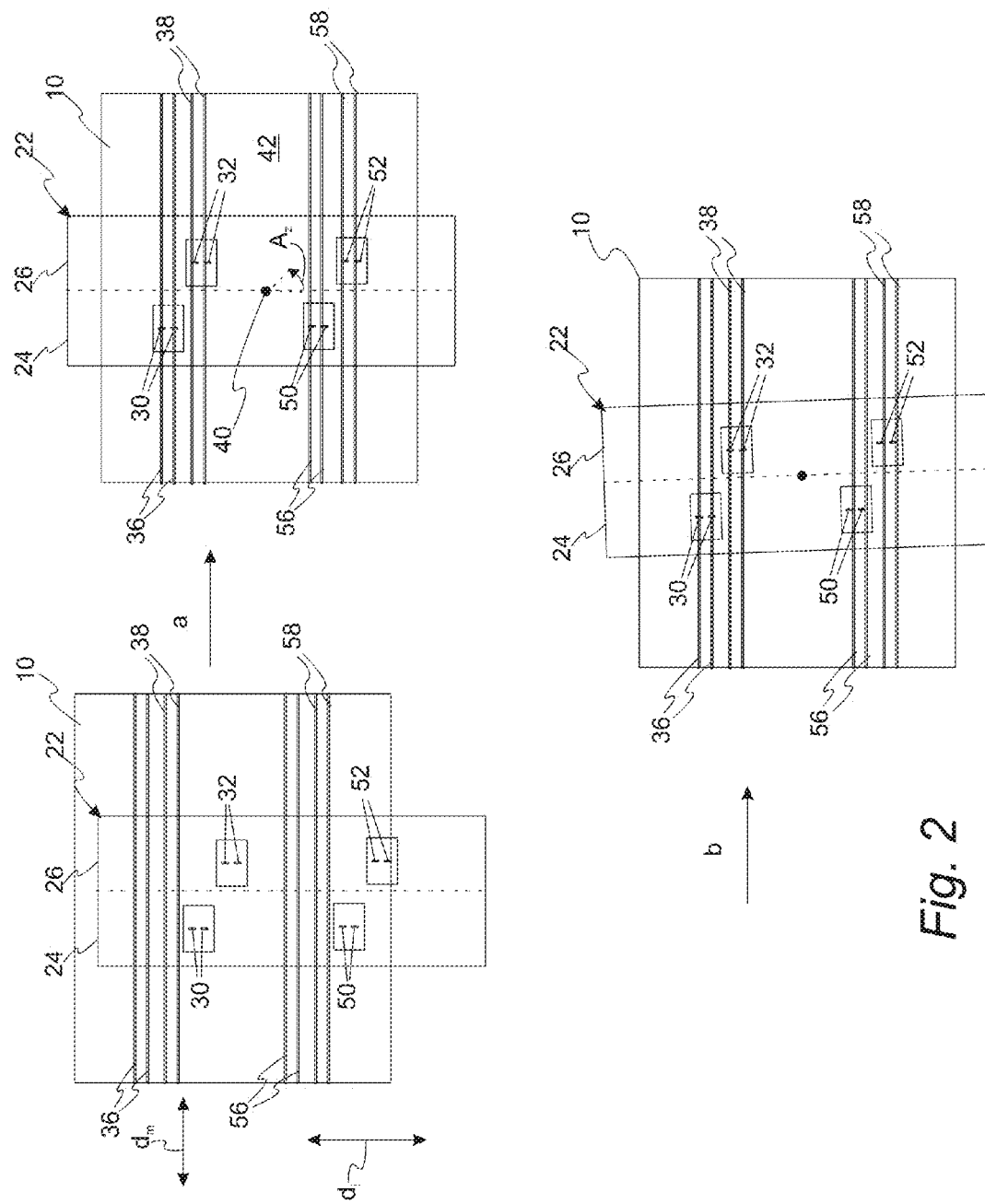
FIG. 2 is a schematic illustrating a method of aligning a magnetic head to data tracks during write operations in which the spacing has changed.

With reference to FIG. 2, the operation of a device for recording and/or reading data to a magnetic tape is illustrated. The device includes a read/write head 22 which has a first device set 24 and a second device set 26. First device set 24 includes a first plurality of magnetic data write elements 30 and second device set 26 includes a second plurality of magnetic data write elements 32. The device also includes a lateral positioning actuator and an azimuth actuator as set forth below in more detail. In step a), the lateral positioning actuator laterally positions the read/write head along direction $d_1$ such that during write operations the first plurality of magnetic data write elements 30 is continuously aligned to a first plurality of recordable data tracks 36 on the magnetic tape 10. In step b), the azimuth actuator rotates the read/write head 22 by an azimuthal angle $A_z$ such that during write operations the second plurality of magnetic data write elements 32 aligns to a second plurality of recordable data tracks 38 on the magnetic tape 10. Azimuthal angle $A_z$ is an angle of rotation about axis 40 which is perpendicular to the face 42 of magnetic tape 10 and to direction $d_m$ which is the direction that magnetic tape 10 moves during read and/or write operations. Axis 40 may be in a location other than shown but will remain perpendicular to the references described above. Such rotation is either clockwise or counter clockwise about axis 40 as needed to align the device sets. In a refinement, the angle of rotation is from 0 to 1 degree.

Still referring to FIG. 2, first device set 24 and second device set 26 are located on read/write head 22 in such a way that one set is positioned downstream from the other with respect to the motion of magnetic tape 10. Once the two device sets are positioned in this manner on the read/write head, the primary axial degree of freedom and the azimuth angle degree of freedom are used together to position both device sets on the media. The primary axial degree of freedom positions the device set writers laterally on the media while the azimuth angle degree of freedom is used to correct the lateral spacing error between the device set writers and the magnetic tape 10. The combination of these two different actuated degrees of freedom allows for proper positioning of the writers on both device sets to their respective data tracks on magnetic tape 10 during write operations.

Figure 3:
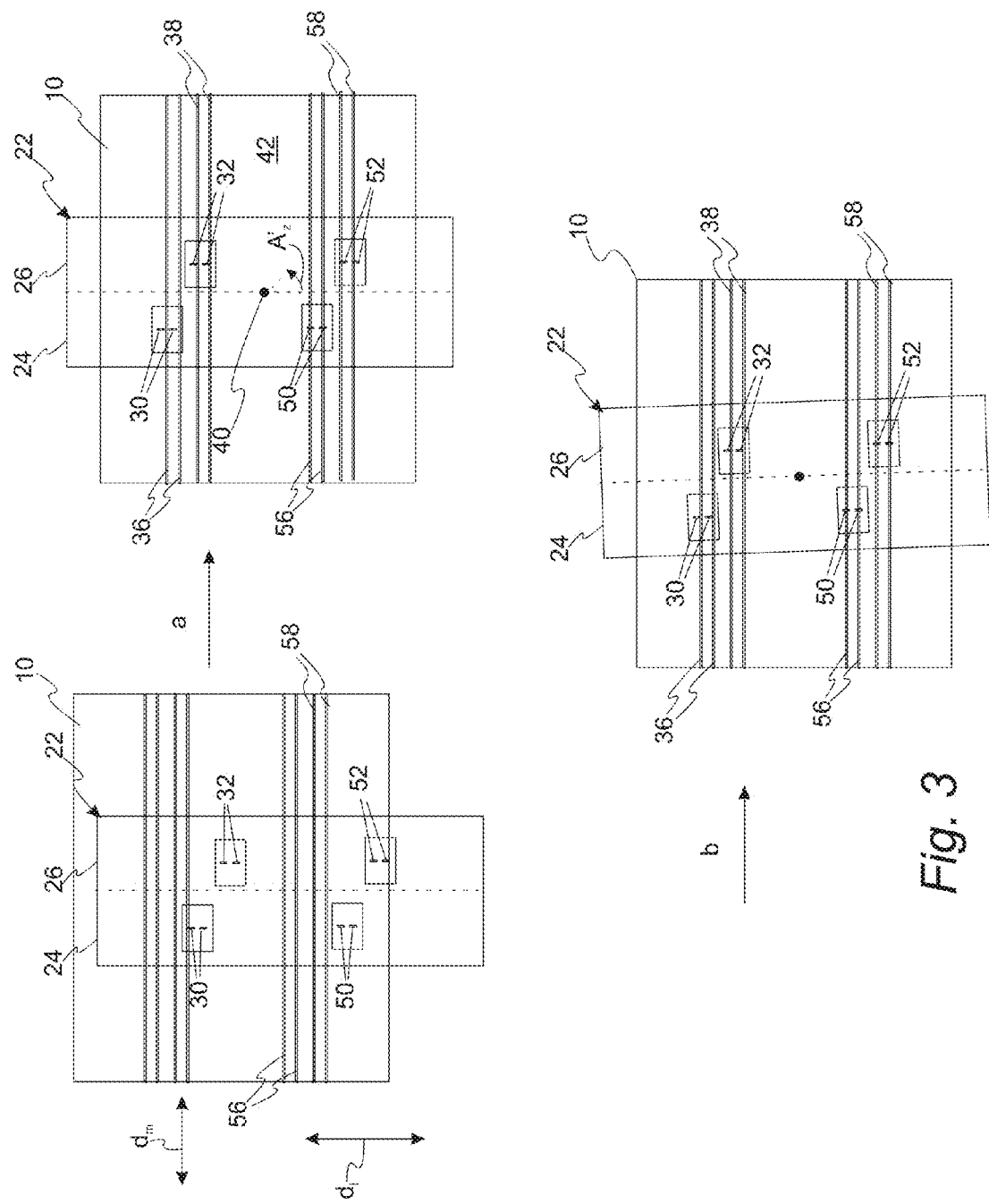
FIG. 3 is a schematic illustrating a method of aligning a magnetic head to data tracks during read operations in which the spacing has changed.

With reference to FIG. 3, first device set 24 further or alternatively includes a first plurality of magnetic data read elements 50 and second device set 26 includes a second plurality of magnetic data read elements 52. In step a), the lateral positioning actuator laterally positions the read/write head along direction $d_1$ such that during read operations the first plurality of magnetic data read elements 50 continuously aligns to a first plurality of readable data tracks 56 on the magnetic tape 10. In step b), the azimuth actuator rotates the read/write head 22 about an azimuthal angle $A_z$ such that during read operations the second plurality of magnetic data read elements 52 aligns to a second plurality of readable data tracks 58 on the magnetic tape 10. Azimuthal angle $A_z$ is an angle of rotation about axis 40 which is perpendicular to the face 42 of magnetic tape 10.

Still referring to FIG. 3, first device set 24 and second device set 26 are located on read/write head 22 in such a way that one set is positioned downstream from the other with respect to the motion of magnetic tape 10. Once the two device sets are positioned in this manner on the read/write head, the primary axial degree of freedom and the azimuth angle degree of freedom are used together to position both device sets on the media. The primary axial degree of freedom positions the device set readers laterally on the media while the azimuth angle degree of freedom is used to correct the lateral spacing error between the device set readers and the magnetic tape 10. The combination of these two different actuated degrees of freedom allows for proper positioning of the readers on both device sets to their respective data tracks on magnetic tape 10 during read operations.

Figure 4:
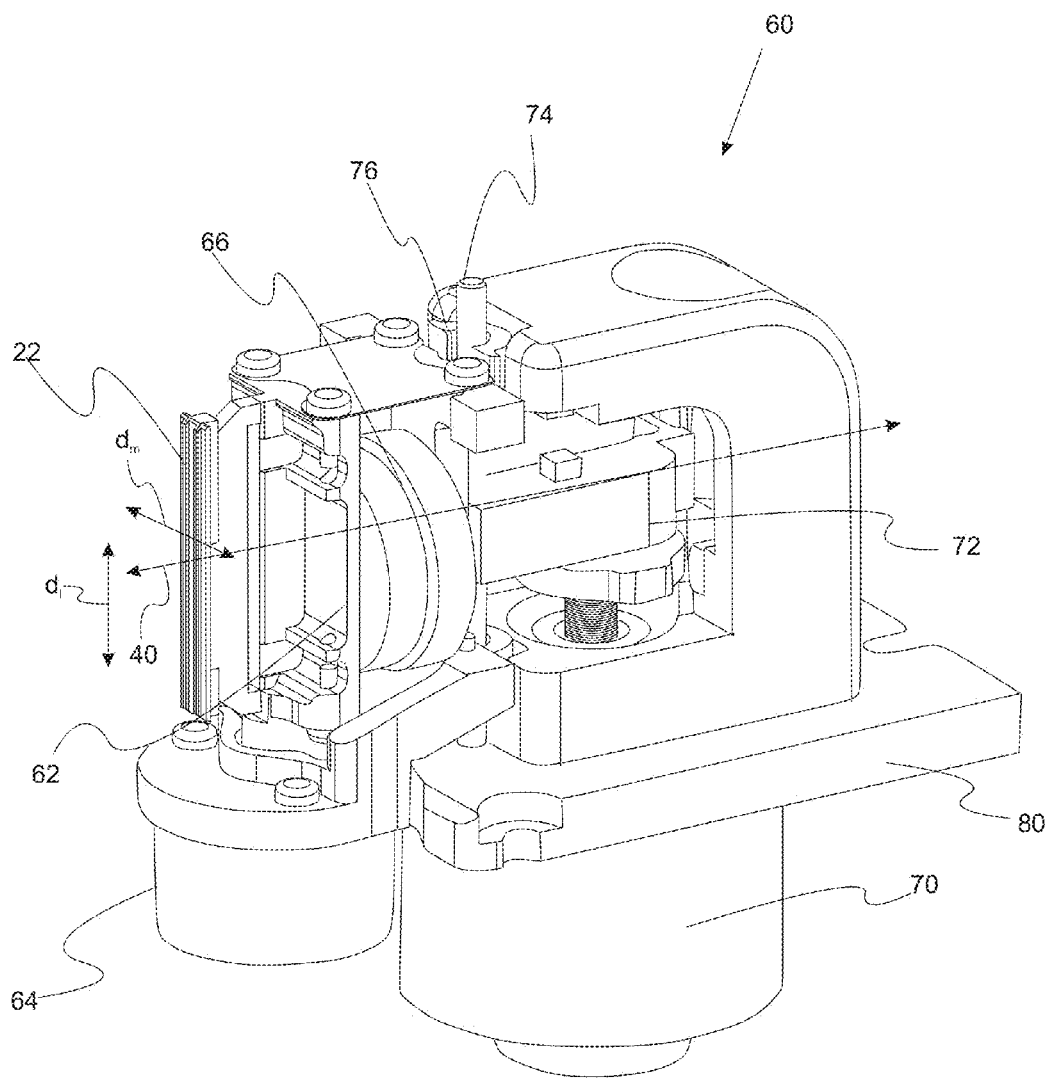
FIG. 4 is a perspective view of a device for recording and/or reading data to and/or from a magnetic tape.

With reference to FIGS. 2, 3, and 4, schematic illustrations of a device for recording and/or reading data to and/or from a magnetic tape as set forth above are provided. FIG. 4 is a perspective view of the device for recording or reading digital data to a magnetic tape. Device 60 includes read/write head 22 which includes first device set 24 and second device set 26 as set forth above. Read/write head 22 is mounted on head carriage 62. First device set 24 includes a first plurality of magnetic data write elements 30 and second device set 26 includes a second plurality of magnetic data write elements 32. The device also includes lateral positioning actuator 64 and azimuth actuator 66. Lateral positioning actuator 64 laterally positions the read/write head along direction $d_1$ such that during write operations the first plurality of magnetic data write elements 30 continuously aligns to a first plurality of recordable data tracks 36 on the magnetic tape 10. Azimuth actuator 66 rotates the read/write head 22 about an azimuthal angle $A_z$ such that during write operations the second plurality of magnetic data write elements 32 aligns to a second plurality of recordable data tracks 38 on the magnetic tape 10. Azimuthal angle $A_z$ is an angle of rotation about axis 40 which is perpendicular to the face 42 of magnetic tape 10.

In a variation as set forth above, first device set 24 further or alternatively includes a first plurality of magnetic data read elements 50 and second device set 26 includes a second plurality of magnetic data read elements 52. Lateral positioning actuator 64 laterally positions the read/write head along direction $d_1$ such that during read operations the first plurality of magnetic data read elements 50 continuously aligns to a first plurality of readable data tracks 56 on the magnetic tape 10. Azimuth actuator 66 rotates the read/write head 22 about an azimuthal angle $A_z$ such that during read operations the second plurality of magnetic data read elements 52 aligns to a second plurality of readable data tracks 58 on the magnetic tape 10. As set forth above, azimuthal angle $A_z$ is an angle of rotation about axis 40 which is perpendicular to the face 42 of magnetic tape 10.

In another variation as set forth above, first device set 24 further or alternatively includes a first plurality of magnetic data write elements 30 and a first plurality of magnetic data read elements 50. The second device set 26 includes a second plurality of magnetic data write elements 32 and a second plurality of magnetic data read elements 52. Lateral positioning actuator 64 laterally positions the read/write head along direction $d_1$ such that during write operations the first plurality of magnetic data write elements 30 continuously aligns to a first plurality of recordable data tracks 36 and that during read operations the first plurality of magnetic data read elements 50 continuously aligns to a first plurality of readable data tracks 56 on the magnetic tape 10. Azimuth actuator 66 rotates the read/write head 22 about an azimuthal angle $A_z$ such that during write operations the second plurality of magnetic data write elements 32 aligns to a second plurality of recordable data tracks 38 and that during read operations the second plurality of magnetic data read elements 52 aligns to a second plurality of readable data tracks 58 on the magnetic tape 10. As set forth above, azimuthal angle $A_z$ is an angle of rotation about axis 40 which is perpendicular to the face 42 of magnetic tape 10.

Still referring to FIGS. 2, 3, and 4, device 60 also includes coarse actuator 70 for positioning read/write head 22 proximate to magnetic tape 10. In particular, coarse actuator 70 provides crude lateral positioning of read/write head 22 while lateral positioning actuator 64 provides a fine adjustment so that the write and/or read elements align to the relevant data tracks. Coarse actuator 70 drives coarse travel carriage 72 during such positioning. Coarse guiding shaft 74 guides the lateral positioning as it moves along a slot in bushing 76 which is mounted to structural support 80.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A device for recording and/or reading data to and/or from a tape, the device comprising a read/write head including:
  a first device set including a first data write element and a first data read element;
  a second device set including a second data write element and a second data read element wherein:
    the first device set is positioned downstream of the second device set relative to motion of the tape or the second device set is positioned downstream of the first device set relative to the motion of the tape; and
    the read/write head does not include more than one data read element or data write element to align to a same data track on the tape;
  a lateral positioning actuator for laterally positioning the read/write head such that during a write operation, the first data write element continuously aligns laterally to a first recordable data track on the tape and that during a read operation, the first data read element continuously aligns laterally to a first readable data track on the tape; and
  an azimuth actuator for rotating the read/write head about an azimuthal angle such that during the write operation, the second data write element aligns laterally to a second recordable data track on the tape and that during the read operation, the second data read element aligns laterally to a second readable data track on the tape, the azimuthal angle being an angle of rotation about an axis perpendicular to the tape, the axis being at a lateral position with respect to tape that is (1) between (a) a lateral position of the first data write element and (b) a lateral position of the first data read element, and (2) between (a) a lateral position of the second data write element and (b) a lateral position of the second data read element.

2. The device of claim 1 wherein the azimuth actuator rotates the read/write head clockwise or counterclockwise.

3. The device of claim 2 wherein the actuator rotates the read/write head by a clockwise or counterclockwise angle from 0 to 1 degree.

4. The device of claim 1 further including a feed reel for providing the tape to the read/write head and a take-up reel for receiving tape from the feed reel.

5. The device of claim 1 wherein the tape is a magnetic tape.

6. A device for accessing data on a tape, the device comprising:
a data access head including:
a plurality of data access elements comprising:
a first data access element for accessing the data on the tape;
a second data access element for accessing the data on the tape, the second data access element positioned downstream of the first data access element relative to motion of the tape; and
a third data access element for accessing the data on the tape, the third data access element positioned at a lateral offset from the first data access element or the second data access element with respect to the tape;
wherein the data access head does not include more than one data access element to align with a same track on the tape; and
an actuator configured for rotating the data access head around an axis that is:
perpendicular to the tape;
at a first lateral position with respect to the tape that is between (a) a second lateral position of the first data access element with respect to the tape and (b) a third lateral position of the second data access element with respect to the tape; and
at a first downstream position relative to the motion of the tape that is between (c) a second downstream position of the second data access element and (d) a third downstream position of the first data access element.

7. The device of claim 6,
wherein the plurality of data access elements further comprise a fourth data access element; and
wherein the first lateral position of the axis with respect to the tape is between (e) a fourth lateral position of the third data access element with respect to the tape and (f) a fifth lateral position of the fourth data access element with respect to the tape.

8. The device of claim 7, wherein the data access head is rotated around the axis to configure a particular lateral distance, with respect to the tape, between the first data access element and the second data access element.

9. The device of claim 6, wherein the actuator is configured for rotating the data access head around an axis such that the first data access element laterally aligns with a first track of the tape.

10. The device of claim 9, wherein the actuator is configured for rotating the data access head around an axis such that the second data access element laterally aligns with a second track of the tape.

11. The device of claim 9, wherein the actuator is configured for rotating the data access head around an axis such that: (a) the first data access element laterally aligns with a first track of the tape concurrently with (b) the second data access element laterally aligning with a second track of the tape.

12. The device of claim 6, wherein both the first data access element and the second data access element include functionality to read and write to the tape.

13. The device of claim 6, wherein the device comprises a second actuator configured for laterally moving the data access head with respect to the tape.

* * * * *

UNITED STATES PATENT AND TRADEMARK OFFICE
CERTIFICATE OF CORRECTION

PATENT NO. : 9,916,860 B2
APPLICATION NO. : 13/800026
DATED : March 13, 2018
INVENTOR(S) : Yeakley et al.

It is certified that error appears in the above-identified patent and that said Letters Patent is hereby corrected as shown below:

On the Title Page

Column 1, under Assignee, Line 2, delete "Redwoood Shores" and insert -- Redwood Shores --, therefor.

On page 2, Column 2, under Abstract, Line 15, delete "angle. such" and insert -- angle such --, therefor.

In the Claims

In Column 7, Line 9, in Claim 3, before "actuator" insert -- azimuth --.

Signed and Sealed this
Twenty-first Day of August, 2018

Andrei Iancu
*Director of the United States Patent and Trademark Office*